US008787821B2

(12) United States Patent
Lim et al.

(10) Patent No.: US 8,787,821 B2
(45) Date of Patent: Jul. 22, 2014

(54) APPARATUS AND METHOD FOR PROVIDING BROADCASTING SERVICE AND SYSTEM THEREOF

(75) Inventors: Hyoungsoo Lim, Daejon (KR); Jae-Young Lee, Daejon (KR); Heung-Mook Kim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 13/130,226

(22) PCT Filed: Jul. 21, 2009

(86) PCT No.: PCT/KR2009/004042
§ 371 (c)(1),
(2), (4) Date: May 19, 2011

(87) PCT Pub. No.: WO2010/058890
PCT Pub. Date: May 27, 2010

(65) Prior Publication Data
US 2011/0221909 A1 Sep. 15, 2011

(30) Foreign Application Priority Data
Nov. 19, 2008 (KR) ........................ 10 2008 011 5195

(51) Int. Cl.
*H04H 20/74* (2008.01)
*H04B 7/00* (2006.01)

(52) U.S. Cl.
USPC ........................ 455/3.02; 455/503; 348/729

(58) Field of Classification Search
USPC ......... 455/3.01–3.05, 74, 105, 503, 515, 526, 455/39; 348/725, 726, 729, 907; 725/63, 725/67, 68, 100, 131
See application file for complete search history.

(56) References Cited

U.S. PATENT DOCUMENTS

| 6,108,556 A * | 8/2000 | Ito ............................... 455/456.2 |
| 7,697,889 B2 * | 4/2010 | Jong ........................... 455/3.06 |
| 7,756,473 B2 | 7/2010 | Seo et al. |
| 7,797,000 B2 * | 9/2010 | Anderson ................. 455/456.2 |

(Continued)

FOREIGN PATENT DOCUMENTS

| KR | 10-2004-0021071 | 3/2004 |
| KR | 10-2004-0031329 | 4/2004 |

(Continued)

OTHER PUBLICATIONS

International Search Report and Written Opinion mailed May 28, 2010 in corresponding International Application PCT/KR2009/004042.

(Continued)

*Primary Examiner* — Dominic E Rego
(74) *Attorney, Agent, or Firm* — Staas & Halsey LLP

(57) ABSTRACT

Disclosed is an apparatus and method for providing a broadcasting service in a single frequency broadcasting network, and a system thereof. The apparatus for receiving broadcasting signals includes an RF receiver configured to receive an RF broadcasting signal having identification information to identify a broadcasting signal transmitter and down-convert the received RF broadcasting signal; a reception characteristic measurer configured to measure reception characteristics of the RF broadcasting signal based on the identification information and generate reception characteristic information; and a reception characteristic transmitter configured to transmit the reception characteristic information to a broadcasting system.

8 Claims, 7 Drawing Sheets

(56) References Cited

U.S. PATENT DOCUMENTS

| | | | |
|---|---|---|---|
| 8,239,895 B2* | 8/2012 | Park et al. | 725/54 |
| 2002/0061750 A1* | 5/2002 | Mohebbi | 455/437 |
| 2004/0064220 A1* | 4/2004 | Kobayashi | 701/1 |
| 2004/0192239 A1* | 9/2004 | Nakao et al. | 455/136 |
| 2004/0253971 A1* | 12/2004 | Akahori | 455/522 |
| 2005/0059343 A1 | 3/2005 | Lee | |
| 2005/0114905 A1* | 5/2005 | Song | 725/132 |
| 2005/0200487 A1* | 9/2005 | O'Donnell et al. | 340/573.1 |
| 2007/0182624 A1* | 8/2007 | Thiesen | 342/174 |
| 2008/0102756 A1* | 5/2008 | Lehtinen | 455/67.11 |
| 2008/0118076 A1* | 5/2008 | Ohkubo et al. | 381/67 |
| 2008/0309565 A1* | 12/2008 | Villarroel et al. | 343/703 |
| 2009/0043462 A1* | 2/2009 | Stratton et al. | 701/50 |
| 2009/0129451 A1* | 5/2009 | Boer et al. | 375/219 |
| 2010/0046429 A1* | 2/2010 | Heath et al. | 370/328 |

FOREIGN PATENT DOCUMENTS

| | | |
|---|---|---|
| KR | 10-2005-0013783 | 2/2005 |
| KR | 10-2005-0109043 | 11/2005 |
| WO | 2004/105391 | 12/2004 |
| WO | 2005/109876 | 11/2005 |

OTHER PUBLICATIONS

"A/53: ATSC Digital Television Standard", Advanced Television Systems Committee, Inc., Jan. 3, 2007.

"Synchronization Standard for Distributed Transmission, Revision A", Advanced Television Systems Committee, Inc., Jul. 19, 2005.

"Digital Video Broadcasting (DVB); Interaction Channel for Digital Terrestrial Television (RCT) Incorporating Multiple Access OFDM", ETSI EN 301 958, V1.1.1, Mar. 2002.

* cited by examiner

APPARATUS AND METHOD FOR PROVIDING BROADCASTING SERVICE AND SYSTEM THEREOF

CROSS REFERENCE TO RELATED APPLICATIONS

This application claims the benefit of International Application No. PCT/KR2009/004042, filed Jul. 21, 2009, and claims the benefit of Korean Application No. 10-2008-0115195, filed Nov. 19, 2008, the disclosures of all of which are incorporated herein by reference.

TECHNICAL FIELD

The present invention relates to an apparatus and a method for providing a broadcasting service in a single frequency broadcasting network and a system thereof.

BACKGROUND ART

A TV broadcasting provider sets up and operates transmitters and repeaters according to the broadcasting service coverage of a broadcast station or the natural environment in the broadcasting service coverage to provide a broadcasting service. A repeater is set up in a shadow region where signals are weakly received to solve the problem of unstable signal reception and extend the transmission range of broadcasting signals transmitted from a main transmitter.

Until now, a terrestrial digital TV broadcasting service according to the Advanced Television System Committee (ATSC) as well as an analog TV broadcasting service is provided through a Multiple Frequency Network (MFN) which is formed allocating a different frequency to each transmitter or repeater. However, since building the multiple frequency network does not allow reusing the same frequency in neighboring areas except for a long distance area, it is inefficient in view of using frequency resources.

This calls for the development of a Single Frequency Network (SFN) that can increase utility efficiency of broadcasting frequency by using the same frequency band in multiple transmitters/repeaters and secure stable power strength within a broadcasting service area. Also, insufficient broadcasting frequency resources allocated to transmitters and repeaters for each broadcast station requires the development of the single frequency network in the circumstances that a terrestrial analog TV broadcasting service and a terrestrial digital TV broadcasting service are provided at the same time.

Technology for configuring a single frequency network includes Digital On-Channel Repeater (DOCR) technology, Distributed Transmitter (DTxT) technology, and Distributed Translator (DTxR) technology in a terrestrial digital TV broadcasting based on the ATSC. According to the DOCR technology, transmitters and repeaters use the same frequency. According to the DTxT technology, the same frequency is used during transmission. According to the DTxR technology, the same frequency is used during repeating. Hereafter, the DOCR technology and the DTxR technology will be described with reference to the accompanying drawings.

FIG. 1 illustrates the DOCR technology.

Referring to FIG. 1, a main transmitter 101 transmits a broadcasting signal through a frequency A. Repeaters 102, 103, 104 and 105, which transmit the broadcasting signal in the same channel that the main transmitter 101 uses, receive the broadcasting signal transmitted from the main transmitter 101 and repeat the broadcasting signal using the same frequency A that the main transmitter 101 uses. Since the DOCR technology requires high isolation between transmission and reception antennas, conventional equipments can be hardly used and thus a great deal of investment is required.

FIG. 2 illustrates the DTxR technology.

Referring to FIG. 2, a main transmitter 201 transmits a broadcasting signal through a frequency A. Repeaters 202, 203, 204 and 205 repeat the broadcasting signal in a frequency B which is different from the frequency A.

When the single frequency network is configured based on the DOCR technology, the DTxT technology or the DTxR technology, the frequency utility efficiency may increase but interference is caused between a transmitter and a repeater or between repeaters or transmitters due to the use of a single frequency. This problem may be solved by controlling transmission powers and timings of each repeater or transmitter in the broadcasting network. Transmitter Identification (TxID) having excellent correlation characteristics is assigned to each transmitter or repeater in order to facilitate the control of the broadcasting network based on the ATSC Recommended Practice (RP) A/110. The assigned TxID is added to a transmission signal or a repeat signal and then transmitted out. The broadcasting is readjusted by measuring reception characteristics caused in transmission channels between transmitters and receivers, or between repeaters and receivers through a TxID signal analyzer based on the ATSC RP A/111.

According to the method for readjusting the broadcasting network, reception characteristic information of a non-signal reception area among areas where a signal of a main transmitter and/or a repeater, or signals of main transmitters and/or repeaters are overlapped is analyzed and power or transmission time of the signals transmitted from a main transmitter and/or those from a repeater is adjusted based on the analyzed reception characteristic information. Broadcasting reception condition of the non-signal reception area may be improved by adjusting the power or the transmission time. Meanwhile, a signal receivable area where signals can be received may turn into a non-signal reception area, or the broadcasting signal reception condition of the signal receivable area may become poor. Since a reception sensitivity should be measured for each field individually and manually to minimize the non-signal reception area, it takes a great deal of time and costs to build and maintain a broadcasting network.

DISCLOSURE

Technical Problem

An embodiment of the present invention is directed to providing a broadcasting service providing an apparatus and method that can automatically control reception power of a broadcasting signal in an area where broadcasting signals are overlapped, and a system thereof.

Another embodiment of the present invention is directed to providing a broadcasting service providing apparatus and method that can automatically control the timing of a broadcasting signal received from an overlapping area where broadcasting signals are overlapped, and a system thereof.

Another embodiment of the present invention is directed to proving a broadcasting service providing apparatus and method that can automatically control a beam forming, Multiple Input Multiple Output (MIMO), and/or transmission diversity of a broadcasting signal transmitter/repeater using more than two antennas, and a system thereof.

Another embodiment of the present invention is directed to providing a broadcasting service providing apparatus and method that can optimize a broadcasting network, and a system thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an embodiment of the present invention, there is provided an apparatus for receiving broadcasting signals, including: an RF receiver configured to receive an RF broadcasting signal including identification information to identify a broadcasting signal transmitter and down-convert the received RF broadcasting signal; a reception characteristic measurer configured to measure reception characteristics of the RF broadcasting signal based on the identification information and generate reception characteristic information; and a reception characteristic transmitter configured to transmit the reception characteristic information to a broadcasting system.

In accordance with another embodiment of the present invention, there is provided a network controlling apparatus, including: a feedback signal receiver configured to receive reception characteristic information of an RF broadcasting signal transmitted from a broadcasting signal transmitter or a broadcasting signal receiver; a network controller configured to generate a control signal to control a transmission timing or a transmission power of the RF broadcasting signal based on the reception characteristic information; and a network control signal transmitter configured to transmit the control signal to the broadcasting signal transmitter.

In accordance with another embodiment of the present invention, there is provided an apparatus for transmitting broadcasting signals, including: a control signal receiver configured to receive a control signal for controlling RF broadcasting signals to be transmitted; a broadcasting signal transmission controller configured to adjust a transmission timing or transmission power of the RF broadcasting signals based on the control signal to produce the adjusted RF broadcasting signals; and a broadcasting signal transmitter configured to transmit the adjusted RF broadcasting signals.

In accordance with another embodiment of the present invention, there is provided a method for receiving broadcasting signals, including: receiving an RF broadcasting signal including identification information for identifying a broadcasting signal transmitter and down-converting the received RF broadcasting signals; measuring reception characteristics of the RF broadcasting signals based on the identification information to generate reception characteristic information; and transmitting the reception characteristic information to a broadcasting system.

In accordance with another embodiment of the present invention, there is provided a method for controlling a network, including: receiving a reception characteristic information of an RF broadcasting signal transmitted from a broadcasting signal transmitter or a broadcasting signal receiver; generating a control signal for controlling a transmission power or a transmission timing of the RF broadcasting signal based on the reception characteristic information; and transmitting the control signal to the broadcasting signal transmitter.

In accordance with another embodiment of the present invention, there is provided a method for transmitting broadcasting signals, including: receiving a control signal for controlling an RF broadcasting signal to be transmitted; adjusting a transmission power or a transmission timing of the RF broadcasting signal based on the control signal; and transmitting the adjusted RF broadcasting signal.

Advantageous Effects

When a broadcasting service providing apparatus of the present invention is used in an overlapping area where broadcasting signals are overlapped, a reception state of a broadcasting signal may be automatically controlled to optimize a broadcasting network.

BEST MODE FOR THE INVENTION

While description of the present invention, a portion apparent to those skilled in the art will be omitted to focus on the points of the present invention. Terms used in this patent specification are merely used to help understand the present invention. However, a different term may be used according to a manufacturing company or research group even if the term is used for the same purpose.

Figure 1:
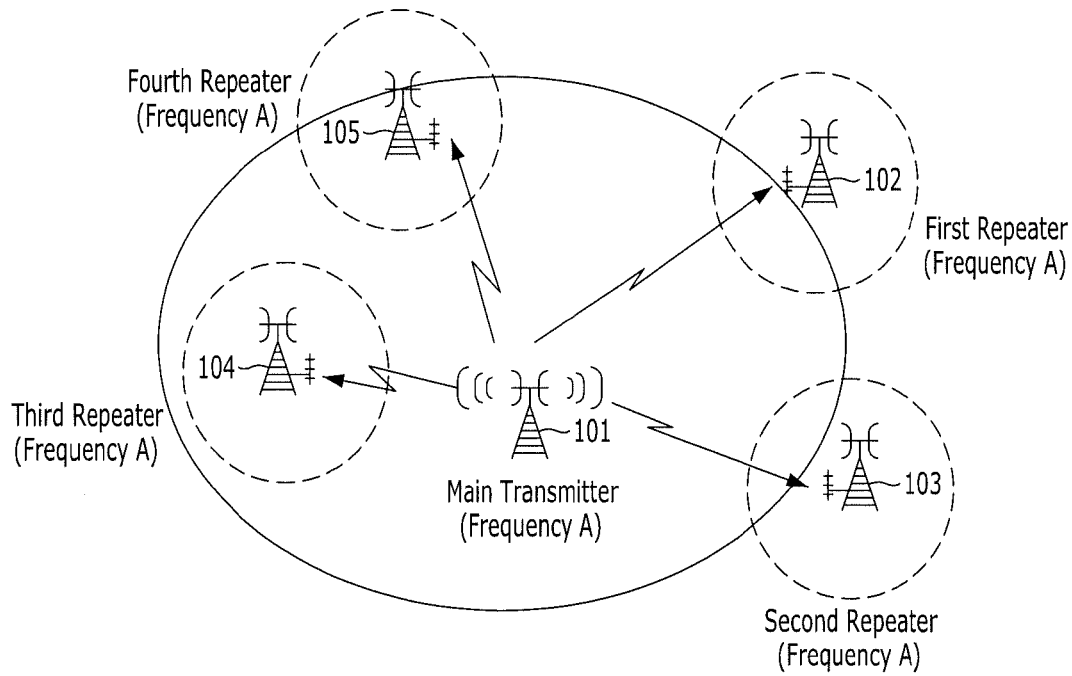
FIG. 1 illustrates Digital On-Channel Repeater (DOCR) technology.
Figure 2:
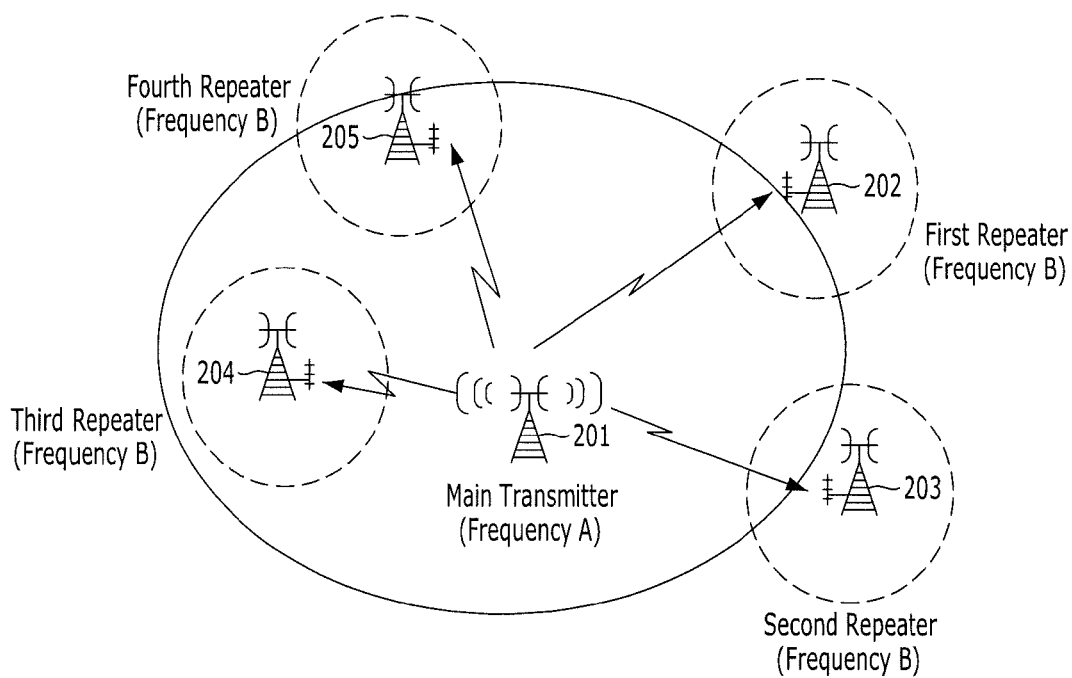
FIG. 2 illustrates Distributed Translator (DTxR) technology.
Figure 3:
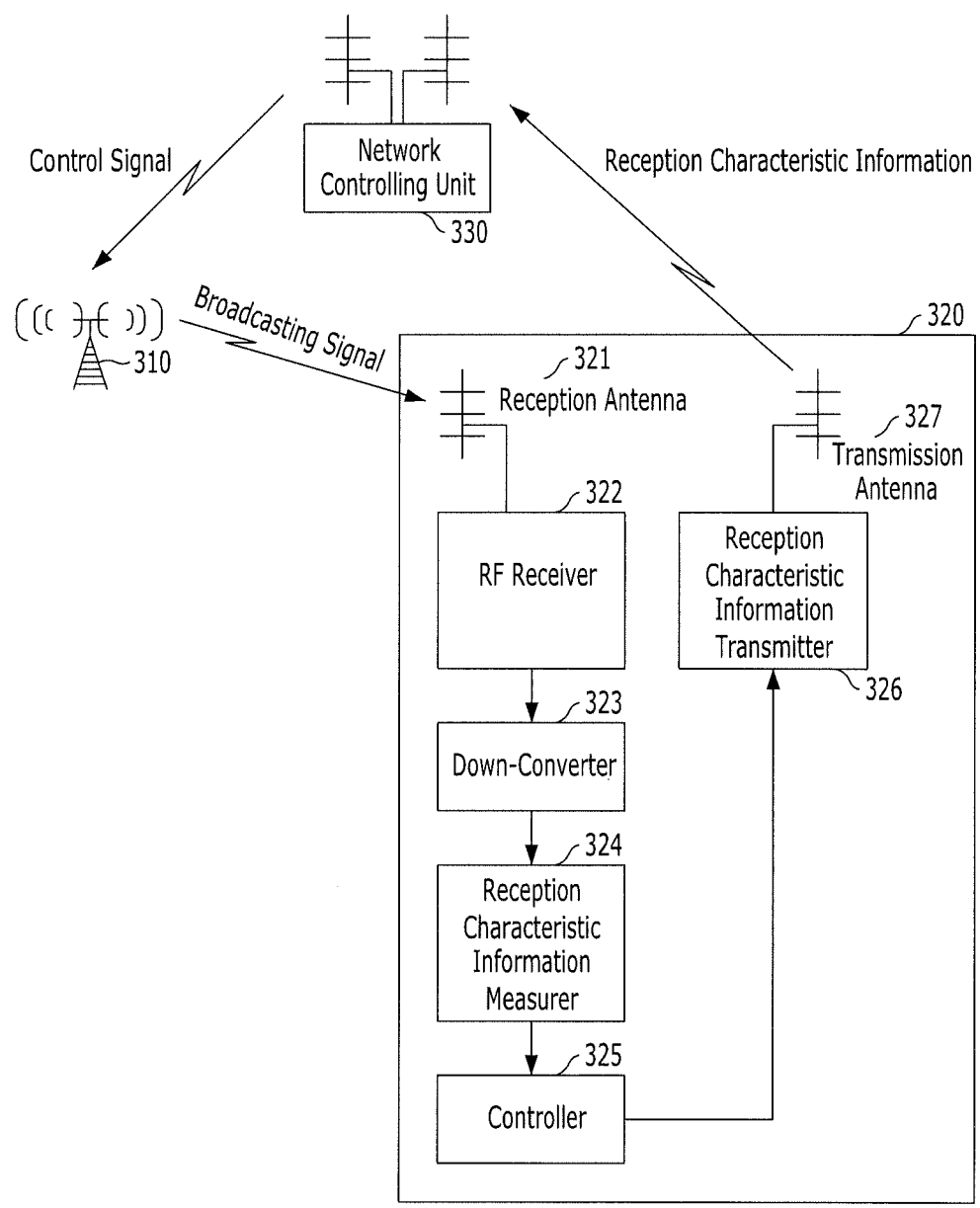
FIG. 3 is a block view showing a broadcasting network system in accordance with a first embodiment of the present invention.

FIG. 3 is a block view showing a broadcasting network system in accordance with a first embodiment of the present invention.

Referring to FIG. 3, the broadcasting network system includes a broadcasting signal transmitter 310, a broadcasting signal receiver 320, and a network controlling unit 330.

The broadcasting signal transmitter 310 transmits a Radio Frequency (RF) broadcasting signal having an identification signal based on a control signal received from the network controlling unit 330. The broadcasting signal transmitter 310 may be a main transmitter or a repeater. The broadcasting signal transmitter 310 may be any device capable of transmitting a broadcasting signal. The identification signal is information unique to the broadcasting signal transmitter 310 transmitting the RF broadcasting signal. According to Transmitter Identification (TxID) technology, the identification signal may be added to the RF broadcasting signal. The addition of the identification signal to the RF broadcasting signal may be realized by a system following the ATSC A/53, which is Digital Television Standard of the U.S., published on Jan. 3, 2007, and the ATSC A/110A, which is Synchronization Standard for Distributed Transmission, published on Jul. 19, 2005. The broadcasting signal transmitter 310 may use two or more transmission antennas so that beam forming technology, Multiple Input Multiple Output (MIMO) technology, or transmission diversity technology may be applied thereto.

The broadcasting signal receiver 320 receives the RF broadcasting signal transmitted from the broadcasting signal transmitter 310, and measures characteristics of the received RF broadcasting signal based on the identification signal included in the RF broadcasting signal. The measured RF broadcasting signal characteristics include reception timing, reception power, or multi-path profile of a transmission channel. Hereafter, the characteristics of the RF broadcasting signal are defined as reception characteristic information. Meanwhile, the reception characteristic information is transmitted to the network controlling unit 330.

To be specific, the broadcasting signal receiver 320 may include a reception antenna 321, an RF receiver 322, a down-converter 323, a reception characteristic information measurer 324, a controller 325, a reception characteristic information transmitter 326, and a transmission antenna 327 as shown in FIG. 3.

The RF receiver 322 receives the RF broadcasting signal having the identification signal using the reception antenna 321.

The down-converter 323 down-converts the received RF broadcasting signal into the signal of a desired band.

The reception characteristic information measurer 324 measures the reception characteristic information caused in a transmission line between the broadcasting signal transmitter 310 and the broadcasting signal receiver 320 based on the correlation between the same identification signal and the identification signal added to the RF broadcasting signal.

The reception characteristic information transmitter 326 receives the reception characteristic information from the reception characteristic information measurer 324 and converts the received reception characteristic information into transmission signals. The reception characteristic information converted into the transmission signals is transmitted to the network controlling unit 330 through the transmission antenna 327.

Meanwhile, the controller 325 may be added between the reception characteristic measurer 324 and the reception characteristic information transmitter 326. When the broadcasting signal receiver 320 receives a plurality of the RF broadcasting signals from a plurality of the broadcasting signal transmitters and a plurality of the reception characteristic informations are measured, the controller 325 may transmit only the reception characteristic information which are equal to or larger than a predetermined threshold to the reception characteristic transmitter 326 among the plurality of reception characteristic informations. The data length of the reception characteristic information transmitted to the network controlling unit 330 may be reduced due to the addition of the controller 325.

Meanwhile, a transmission channel of the reception characteristic information between the broadcasting signal receiver 320 and the network controlling unit 330 may be cable. That is, the transmission channel of the reception characteristic information between the broadcasting signal receiver 320 and the network controlling unit 330 may be provided by connecting the broadcasting network with the wired or wireless communication network. Also, the transmission channel of the reception characteristic information between the broadcasting signal receiver 320 and the network controlling unit 330 may be provided through a wired or wireless transmission channel following the backward transmission standard for a broadcasting network such as the European Digital Video Broadcasting (DVB)—Interaction Channel for Digital Terrestrial Television (RCT) standard, which is disclosed by European Telecommunications Standards Institute (ETSI), *Digital Video Broadcasting (DVB); Interaction Channel for Digital Terrestrial Television (RCT) Incorporating Multiple Access OFDM* ETSI EN pp. 301~958, V1.1.1, March 2002.

The network controlling unit 330 receives the reception characteristic information outputted from the broadcasting signal receiver 320 and generates the control signal for controlling the power or timing of RF broadcasting signal transmitted from the broadcasting signal transmitter 310, or an MIMO transmission method based on the received reception characteristic information. When the broadcasting signal transmitter 310 uses more than two antennas, the control signal may include information or a parameter needed to control a beam forming method, an MIMO scheme, or a transmission diversity method.

Meanwhile, the signal transmission channel between the network controlling unit 330 and the broadcasting signal transmitter 310 may be cable or wireless. Herein, the control method of the broadcasting signal transmitter 310 in the network controlling unit 330 may be determined through diverse methods.

Figure 4:
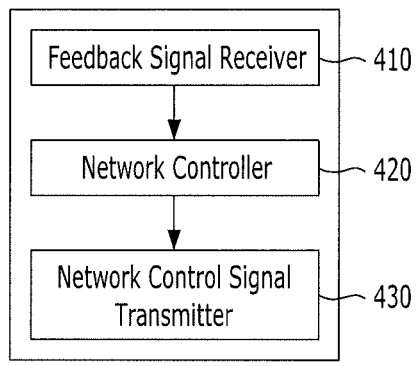
FIG. 4 is a detailed block view illustrating a network controller shown in FIG. 3.

FIG. 4 is a detailed block view illustrating the network controlling unit 330 shown in FIG. 3.

Referring to FIG. 4, the network controlling unit 330 includes a feedback signal receiver 410, a network controller 420, and a network control signal transmitter 430.

The feedback signal receiver 410 receives the reception characteristic information outputted from the broadcasting signal receiver 320 shown in FIG. 3. The reception characteristic information means the power or timing of the RF broadcasting signal received from the broadcasting signal receiver 320, or multi-path profile of the transmission channel. Herein, the broadcasting signal receiver 320 and the feedback signal receiver 410 may be connected through cable.

The network controller 420 generates the control signal for controlling the power or timing of the RF broadcasting signal received from the broadcasting signal transmitter 310, or an MIMO transmission method based on the received reception characteristic information. The control information may include control information for each broadcasting signal transmitter 310 to maximize the number of the broadcasting signal receivers 320 with fine reception characteristic. Also, the control information may include control information for minimizing the transmission frequency or the data length of the reception characteristic information for each broadcasting signal transmitter 310.

The network control signal transmitter 430 transmits the control signal to the broadcasting signal transmitter 310 shown in FIG. 3 wirelessly or through cable.

According to the configuration of the network controlling unit 330, the power or timing of RF broadcasting signals, or an MIMO transmission method may be automatically controlled in an overlapping area where RF broadcasting signals are overlapped. Through this process, the broadcasting network can be optimized.

Figure 5:
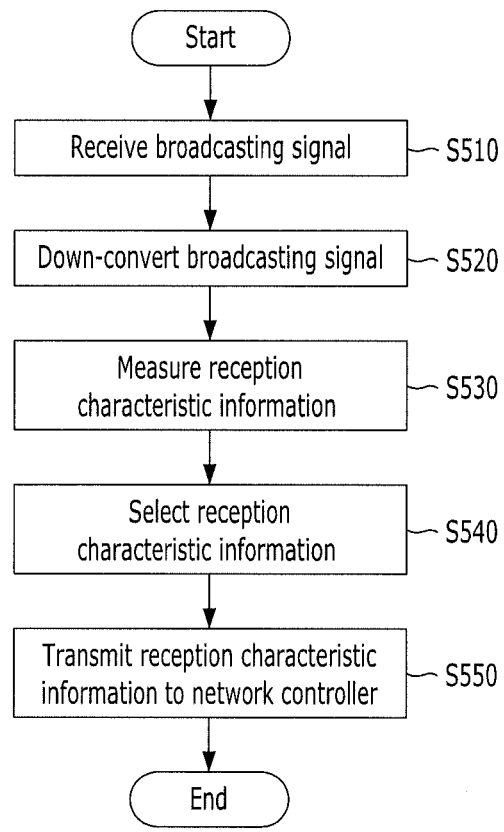
FIG. 5 is a flowchart describing a method for receiving broadcasting signals in accordance with the first embodiment of the present invention.

FIG. 5 is a flowchart describing a method for receiving broadcasting signals in accordance with the first embodiment of the present invention.

Referring to FIG. 5, in step S510, an RF broadcasting signal having identification information is received. In step S520, the received RF broadcasting signal is down-converted into a desired band. In step S530, the reception characteristic information caused by the path between the broadcasting signal transmitter 310 and the broadcasting signal receiver 320 shown in FIG. 3 is measured. The received reception characteristic information is measured using the identification information added to the RF broadcasting signal. The measured reception characteristic information is transmitted to the network controller wirelessly or through cable in step S550.

The reception characteristic information which is equal to or larger than a predetermined threshold among a plurality of reception characteristic information may be selected in step S540 between the steps S530 and S550.

Figure 6:
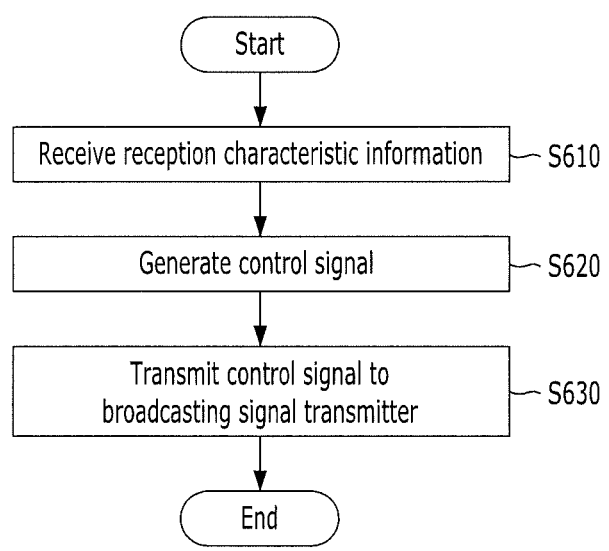
FIG. 6 is a flowchart describing a method for controlling a network in accordance with the first embodiment of the present invention.

FIG. 6 is a flowchart describing a method for controlling a network in accordance with the first embodiment of the present invention.

Referring to FIG. 6, first, the reception characteristic information is received from the broadcasting signal receiver 320 shown in FIG. 3 wirelessly or through cable in step S610. The reception characteristic information means the reception power or reception timing of an RF broadcasting signal transmitted from the broadcasting signal receiver 320, or multi-path profile.

Subsequently, in step S620, the control signal is generated based on the reception characteristic information. The generated control signal is used to control the reception power or the reception timing of the RF broadcasting signal received by the broadcasting signal receiver 320, or the MIMO transmission method. Subsequently, in step S630, the generated control signal is transmitted to the broadcasting signal transmitter 310 shown in FIG. 3 wirelessly or through cable.

Figure 7:
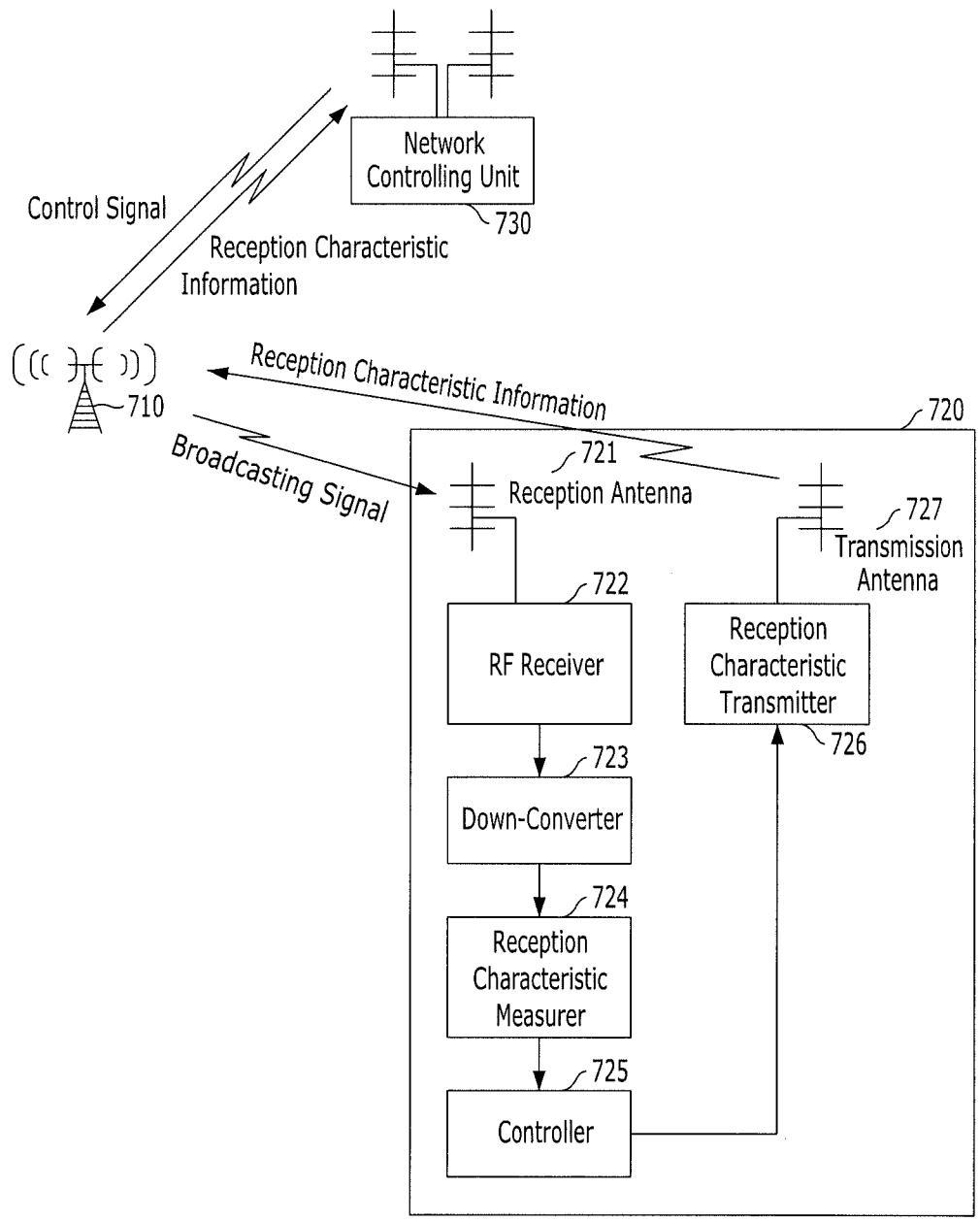
FIG. 7 illustrates a broadcasting network system in accordance with a second embodiment of the present invention.

FIG. 7 illustrates a broadcasting network system in accordance with a second embodiment of the present invention.

Referring to FIG. 7, the broadcasting network system includes a broadcasting signal transmitting unit 710, a broadcasting signal receiving unit 720, and a network controlling unit 730.

The broadcasting signal transmitting unit 710 transmits RF broadcasting signals with predetermined identification signals in response to a control signal received from the network controlling unit 730, receives reception characteristic information generated in the broadcasting signal receiving unit 720 wirelessly or through cable, and transmits the received reception characteristic information to the network controlling unit 730 wirelessly or through cable. The broadcasting signal transmitting unit 710 may be a main transmitter or a repeater. The broadcasting signal transmitting unit 710 means any devices capable of transmitting a broadcasting signal. The identification signal is information unique to the broadcasting signal transmitting unit 710.

According to the TxID technology, the identification signal may be added to the RF broadcasting signal. The addition of the identification signal to the RF broadcasting signal may be realized in a system based on the Advanced Television System Committee (ATSC) A/53, which is Digital Television Standard of the U.S., published on Jan. 3, 2007, and ATSC A/110A, which is Synchronization Standard for Distributed Transmission, published on Jul. 19, 2005. The broadcasting signal transmitting unit 710 may use more than two transmission antennas so that beam forming method, MIMO scheme, or transmission diversity method may be applied thereto.

The broadcasting signal receiving unit 720 measures the reception characteristic information of the RF broadcasting signal transmitted from the broadcasting signal transmitting unit 710 and transmits the measured reception characteristic information to the broadcasting signal transmitting unit 710. The reception characteristic information may include the reception timing or the reception power of the RF broadcasting signal transmitted from the broadcasting signal transmitting unit 710, or multi-path profile of the transmission channel. The signal transmission channel between the broadcasting signal receiving unit 720 and the broadcasting signal transmitting unit 710 may be wireless or cable. Since description on the structure of the broadcasting signal receiving unit 720 is the same as the description on the structure of the broadcasting signal receiver 320 of FIG. 3, detailed description thereon will not be provided herein.

The network controlling unit 730 designs a network configuration based on the reception characteristic information received from the broadcasting signal transmitting unit 710. That is, the network controlling unit 730 transmits the control signal to the broadcasting signal transmitting unit 710 wirelessly or through cable and controls the power or timing of an RF broadcasting signal transmitted from the broadcasting signal transmitting unit 710, or the MIMO transmission scheme. The control signal may include information or a parameter needed to control a beam forming method, an MIMO scheme, or a transmission diversity method. Since description on the structure of the network controlling unit 730 is the same as the description on the structure of the network controlling unit 330 of FIG. 3, detailed description thereon will not be provided herein.

Since the broadcasting signal transmitting unit 710 in accordance with the second embodiment of the present invention controls the reception power or the reception timing of the RF broadcasting signal, or the MIMO transmission method by using the control signal transmitted from the network controlling unit 730, the reception power or the reception timing of the RF broadcasting signal, or the MIMO transmission scheme are not manually controlled. That is, the reception power or the reception timing of the RF broadcasting signal, or the method for transmitting MIMO is automatically controlled by the network controlling unit 730. When the broadcasting signal transmitting unit 710 is positioned closer to the broadcasting signal receiving unit 720 than the network controlling unit 730, the reception characteristic information can be transmitted to the network controlling unit 730 at lower power consumption. Particularly, since the reception characteristic information of each broadcasting signal receiver set in the single frequency network is transmitted in real-time to the network controlling unit 730 through the broadcasting signal transmitting unit 710, the broadcasting signal receiving unit 720 in the broadcasting network can be provided with optimal reception environment.

Figure 8:
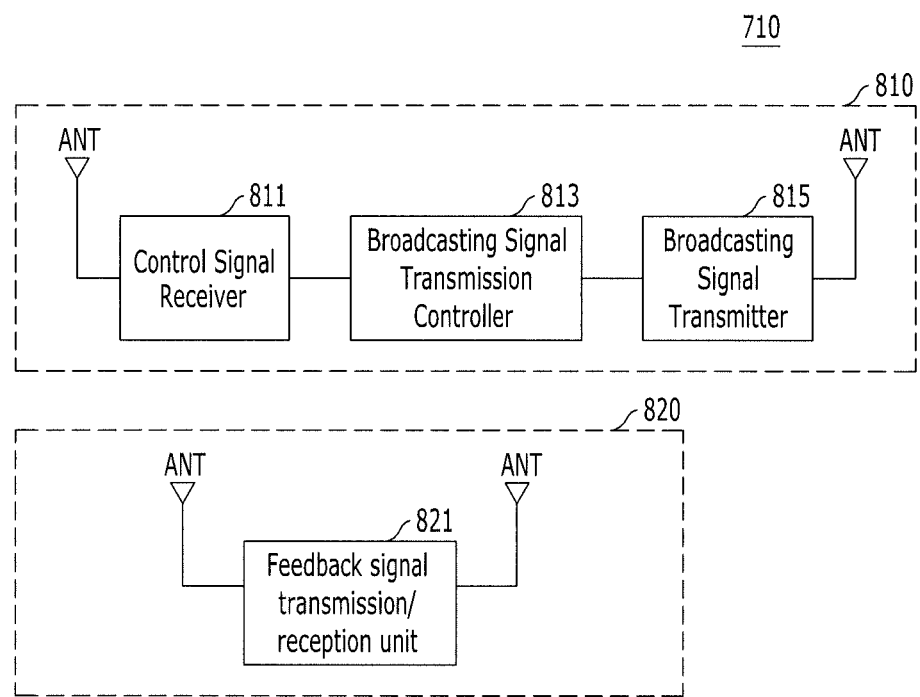
FIG. 8 is a detailed block diagram illustrating a broadcasting signal transmitter shown in FIG. 7.

FIG. 8 is a detailed block diagram illustrating the broadcasting signal transmitting unit 710 shown in FIG. 7.

Referring to FIG. 8, the broadcasting signal transmitting unit 710 includes a broadcasting signal processor 810 and a reception characteristic information processor 820.

The broadcasting signal processor 810 may include a control signal receiver 811, a broadcasting signal transmission controller 813, and a broadcasting signal transmitter 815. The control signal receiver 811 receives the control signal transmitted from the network controlling unit 730 shown in FIG. 7. The broadcasting signal transmission controller 813 receives the broadcasting signal from the broadcast station (not shown). The broadcasting signal transmission controller 813 controls the power or the timing of an RF broadcasting signal to be transmitted, or MIMO transmission scheme using the received control signal. The broadcasting signal transmitter 815 amplifies RF broadcasting signal obtained after the adjustment of the transmission power, transmission timing, or the MIMO transmission method and thereby provide amplified signal to the transmission antenna.

Meanwhile, the reception characteristic information processor 820 may include transmission antennas, reception antennas, and a feedback signal transmission/reception unit 821. The reception characteristic information processor 820 receives the reception characteristic information transmitted from the broadcasting signal receiving unit 720 shown in FIG. 7 and transmits the received reception characteristic information to the network controller 730 shown in FIG. 7.

Figure 9:
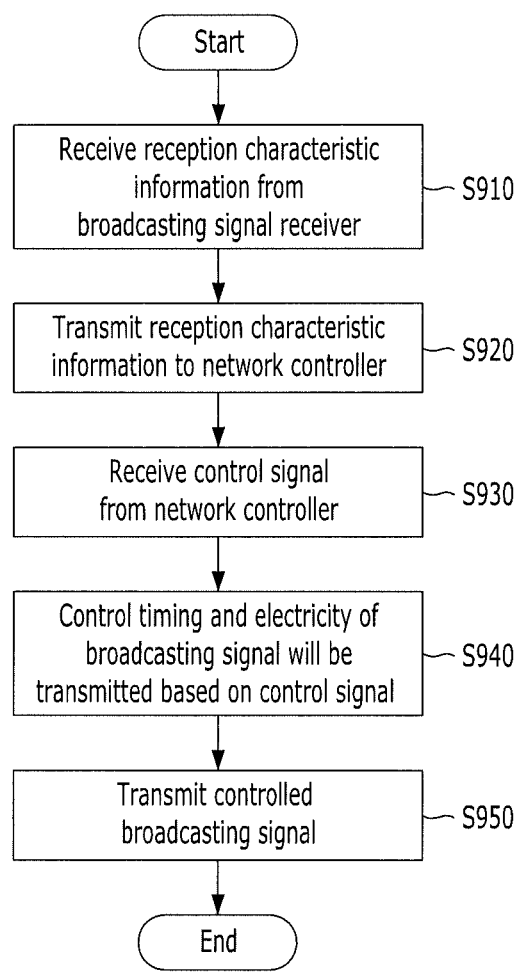
FIG. 9 a flowchart describing a method for transmitting broadcasting signals in accordance with the second embodiment of the present invention.

FIG. 9 a flowchart describing a method for transmitting broadcasting signals in accordance with the second embodiment of the present invention.

Referring to FIG. 9, first, in step S910, the reception characteristics of the RF broadcasting signal transmitted from the broadcasting signal transmitting unit 710 shown in FIG. 7 is received from the broadcasting signal receiving unit 720. In step S920, the received reception characteristic information is transmitted to the network controlling unit 730. In step S930, the control signal for controlling the power or the timing of the RF broadcasting signal received by the broadcasting signal receiving unit 720, or the MIMO transmission method based on the reception characteristic information is received from the network controlling unit 730. In step S940, the power or the timing of the RF broadcasting signal to be transmitted, or MIMO transmission scheme is adjusted based on the received control signal. In step S950, the adjusted RF broadcasting signals obtained after the adjustment of the transmission power, the transmission timing, or the MIMO transmission scheme is transmitted.

The present application contains subject matter related to Korean Patent Application No. 10-2008-0115195, filed in the Korean Intellectual Property Office on Nov. 19, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for receiving broadcasting signals, comprising:
    a radio frequency (RF) receiver configured to receive an RF broadcasting signal including identification information for identifying a broadcasting signal transmitter and down-convert the received RF broadcasting signal;
    a reception characteristic measurer configured to measure reception characteristics of the RF broadcasting signal based on the identification information and generate reception characteristic information; and
    a reception characteristic transmitter configured to transmit the reception characteristic information to a broadcasting system.

2. The apparatus of claim 1, further comprising:
    a controller configured to select the reception characteristic information equal to or larger than a predetermined threshold among the reception characteristic information and provide the selected reception characteristic information to the reception characteristic transmitter.

3. The apparatus of claim 1, wherein the reception characteristic transmitter transmits the reception characteristic information to a network controller which controls the reception characteristics of the RF broadcasting signal.

4. The apparatus of claim 1, wherein the reception characteristic transmitter transmits the reception characteristic information to the broadcasting signal transmitter.

5. A method for receiving broadcasting signals, comprising:
    receiving an RF broadcasting signal including identification information for identifying a broadcasting signal transmitter and down-converting the received RF broadcasting signals;
    measuring reception characteristics of the RF broadcasting signals based on the identification information to generate reception characteristic information; and
    transmitting the reception characteristic information to a broadcasting system.

6. The method of claim 5, further comprising:
    selecting the reception characteristic information equal to or larger than a predetermined threshold among the reception characteristic information generated in said measuring the reception characteristic information of the RF broadcasting signals corresponding to the identification information to generate the reception characteristic information.

7. The method of claim 5, wherein in said transmitting the reception characteristic information to the broadcasting system, the reception characteristic information is transmitted to a network controller for controlling the reception characteristic of the RF broadcasting signals.

8. The method of claim 5, wherein in said transmitting the reception characteristic information to the broadcasting system,
    the reception characteristic information is transmitted to the broadcasting signal transmitter.

* * * * *